United States Patent [19]
Stevens, Jr.

[11] 3,918,680
[45] Nov. 11, 1975

[54] STOPCOCK

[75] Inventor: Frederick F. Stevens, Jr., Fairfield, Conn.

[73] Assignee: Hoff-Stevens, Inc., Ansonia, Conn.

[22] Filed: Feb. 5, 1974

[21] Appl. No.: 439,740

[52] U.S. Cl.............................. 251/287; 251/312
[51] Int. Cl.²......................................... F16K 5/08
[58] Field of Search .......... 251/309, 312, 314, 316, 251/286, 287, 288; 137/315; 277/9, 10

[56] References Cited
UNITED STATES PATENTS

| | | | |
|---|---|---|---|
| 266,132 | 10/1882 | Goodrich | 251/287 |
| 849,724 | 4/1907 | Christ | 251/287 |
| 904,299 | 11/1908 | Best | 251/309 X |
| 2,433,732 | 12/1947 | Brown | 251/309 X |
| 2,839,074 | 6/1958 | Kaiser | 251/288 X |
| 3,111,299 | 11/1963 | Miller et al. | 251/309 X |

Primary Examiner—Martin P. Schwadron
Assistant Examiner—Robert J. Miller
Attorney, Agent, or Firm—McCormick, Paulding & Huber

[57] ABSTRACT

A stopcock for connection with a fluid conduit has a bore which extends transversely through the body thereof to intersect a fluid passageway therethrough. A turn plug for stopping, starting and regulating fluid flow through the passageway comprises two parts assembled from opposite ends of the bore to prevent damage to O-ring seals carried by the turn plug. A single fastener secured to the body cooperates with the turn plug to retain it in assembly with the body and limit its angular movement between open and closed positions.

11 Claims, 6 Drawing Figures

STOPCOCK

BACKGROUND OF THE INVENTION

This invention relates in general to stopcocks for stopping, starting and regulating fluid flow through a conduit and deals more particularly with an improved stopcock of a type which includes a turn plug provided with annular seal members and supported in a bore which intersects a fluid passageway through the stopcock body. In a simple stopcock of the aforedescribed type, it is customary to form the turn plug bore and the fluid passageway by drilling or boring intersecting cylindrical holes through the stopcock body. The latter intersections are usually defined by relatively sharp edges. When the turn plug is inserted into the bore through one end thereof, the seal member at the leading end of the plug may be knicked or cut by the aforesaid sharp edge. Accordingly, it is the general aim of the present invention to provide a stopcock of the aforedescribed general type which may be readily assembled while avoiding serious risk of seal damage during assembly and which includes improved means for maintaining the parts thereof in assembly.

SUMMARY OF THE INVENTION

In accordance with the present invention, an improved stopcock is provided which has a body and includes a cylindrical turn plug carrying a pair of axially spaced annular elastomeric seal members and received in a bore which extends transversely through the body to intersect a fluid passageway therethrough. The manner in which the seal members are assembled with the turn plug avoids risk of damage to the seal members. A single retaining element secured to the body retains the turn plug in assembly therewith and limits its angular movement between open and closed positions.

DETAILED DESCRIPTION OF THE PREFERRED EMBODIMENT

Figure 1:
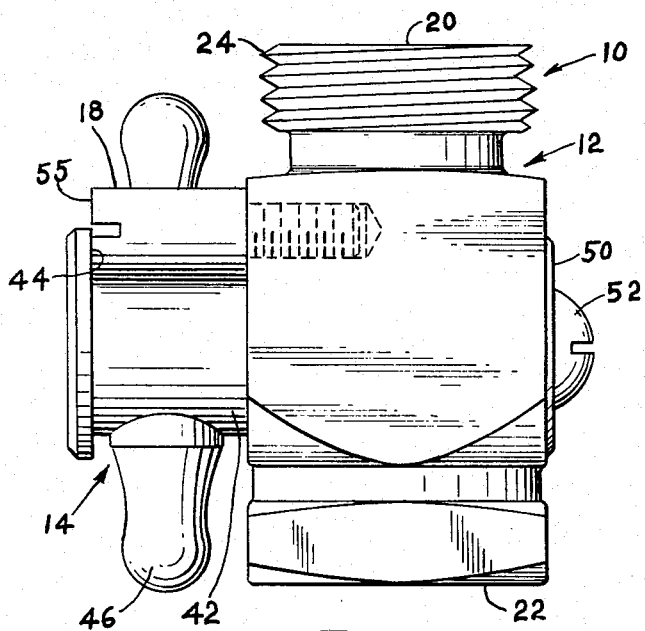
FIG. 1 is a side elevational view of a stopcock embodying the present invention.

Turning now to the drawing, a stopcock embodying the present invention and indicated generally by the reference numeral 10 comprises a body indicated generally at 12 adapted for connection to a conduit (not shown) to define a portion of fluid passageway and a turn plug designated generally by the numeral 14 and supported in the body 12 for limited angular movement relative thereto to stop, start and regulate the fluid flow therethrough. A pair of angular seal members or O-rings 16, 16 carried by the turn plug 14 provide substantially fluid type seal between the turn plug and the body 12, as will be hereinafter further discussed. The single fastener, 18 mounted on the body 12 retains the turn plug 14 in assembled position therein and also limits its angular movement between opened and closed positions relative to the body as will be hereinafter further discussed.

Figure 2:
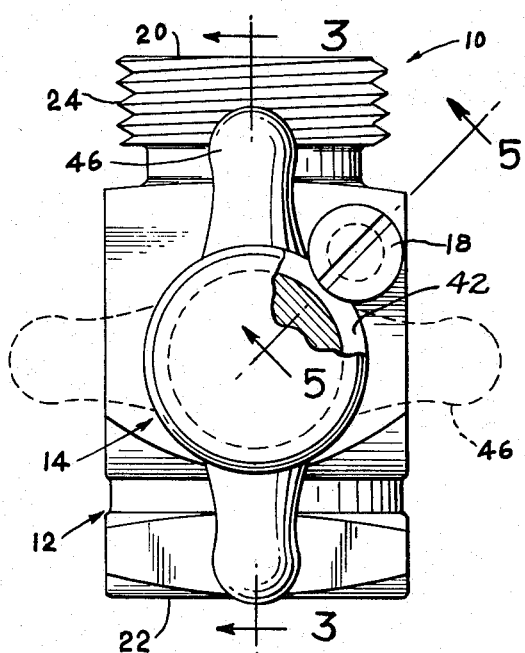
FIG. 2 is a front elevational view of the stopcock of FIG. 1, a frontal portion of the plug shank shown broken away to reveal structure therebehind.

The body 12 is preferably made from metal and has upper and lower ends respectively designated as inlet end 20 and outlet end 22, as shown in FIG. 2. A male thread 24 surrounds the inlet end 20 and a female thread 26 is provided at the outlet end 22 to facilitate connection to a fluid conduit or the like (not shown). The body 12 further includes a generally cylindrical plug bore 28 which extends transversely therethrough. A fluid inlet passageway 30 at the upper part of the body 12 opens through the inlet end 20 and communicates with the bore 28. In like manner, a fluid outlet passageway 32 in the lower part of the body 12 communicates with the bore 28 and opens through the outlet end 22. The inlet and outlet passageways 30 and 32 are preferably formed by drilling or boring a single generally cylindrical hole through the housing 12 which intersects the bore 28. At this point it should be noted that a relatively sharp edge 34 is defined by the intersection of the passageway 30 and the bore 28, as best shown in FIG. 2. A similar sharp edge indicated by the numeral 36 occurs at the intersection of the outlet passageway 30 and the lower portion of the bore 28.

Figure 3:
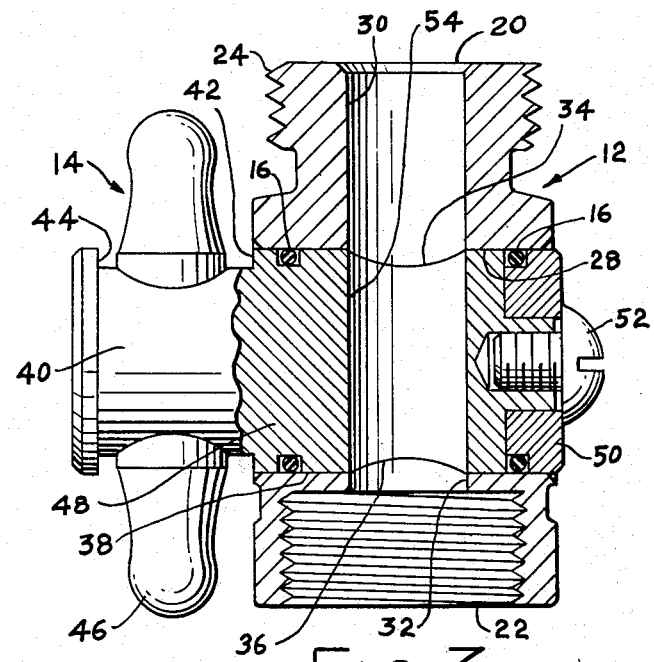
FIG. 3 is a side elevational view of the stopcock of FIG. 1 shown partially in section taken along the line 3—3 of FIG. 2.

Considering now the turn plug 14 in further detail, it includes a generally cylindrical portion 38 received with the bore 28 and a shank portion 40 which extends coaxially outwardly from the cylindrical portion and beyond the body 12. The cylindrical portion 38 has a diameter substantailly equal to the diameter of the bore 28, however, the shank portion 40 has a slightly smaller diameter intermediate the cylindrical portion 38 and its outer end. The cylindrical portion 38 has a generally radially disposed annular bearing surface 42 which surrounds the shank portion 40 and faces in an axially outward direction. At its outer end, the shank portion 40 has another annular bearing surface 44 which faces in an axially inward direction. A handle 46 carried by the shank portion 40 has opposite ends which extend outwardly therefrom in diametrically opposite directions. The cylindrical portion 38 includes a main part 48 and another part or end cap 50 retained in assembly with the main part by a single threaded fastener 52, as best shown in FIG. 3. A cylindrical connecting passageway 54 extends through the main part 48 to communicate with the inlet passageway 30 and the outlet passageway 32 when the turn plug 14 is in its open position, as it appears in full lines in FIGS. 1–3. One of the O-ring seals 16, 16 is disposed in an annular recess formed in the main part 48 intermediate the shank portion 40 and the connecting passageway 54. The other O-ring seal is mounted in another annular recess which, as shown, is at least partially defined by the end cap 50, and the main part 48 as shown in FIG. 3.

The fastener 18 which retains the turn plug 14 in assembly with the body 12 comprises a generally cylindrical stud which has a threaded shank of reduced diameter. The outer or slotted end of the stud 18 defines a radially disposed axially outwardly facing abutment surface 55 which engages the bearing surface 44 to limit axial movement of the turn plug 14 in one direction relative to the body 12. Another radially disposed axially inwardly facing abutment surface 56 surrounds the threaded shank of the stud 18, engages the bearing surface 42, and restrains the turn plug 14 against axial movement in the opposite direction relative to the body 12.

In assembling the stopcock 10, an O-ring 16 is first positioned in the annular recess in the main part 48. Thereafter, the main part is inserted into the bore 28 from the left end thereof, as oriented in FIG. 3. After the main part 48 has been partially inserted into the bore 28, the stud 18 is positioned adjacent the shank portion 40 and in parallel relation thereto between the bearing surfaces 42 and 44 and the threaded end thereof is brought into threadable engagement with the body 12. The stud 18 is then threaded into the body 12. It will be evident that engagement of the abutment surface 56 with the bearing surface 42 will cause the main part 48 to be drawn into the bore 28 as the stud 18 is threaded into the body 12. After the stud 18 has been threaded into seating engagement with the body 12, the other O-ring 16 is positioned on the end cap 50 and the end cap and O-ring associated therewith are inserted into the bore 28 from the right-end thereof. The assembly is completed by threading the fastener 52 into the main part 48 to retain the end cap 50 in assembly therewith.

It will now be evident that since one O-ring 16 is assembled in the bore 28 through one end thereof and the other O-ring 16 is assembled in the bore through its opposite end, neither O-ring is required to contact or pass over the sharp edges 34 and 36 during assembly. Accordingly, the risk of shearing or otherwise damaging one of the O-rings during assembly is substantially eliminated.

Figure 4:
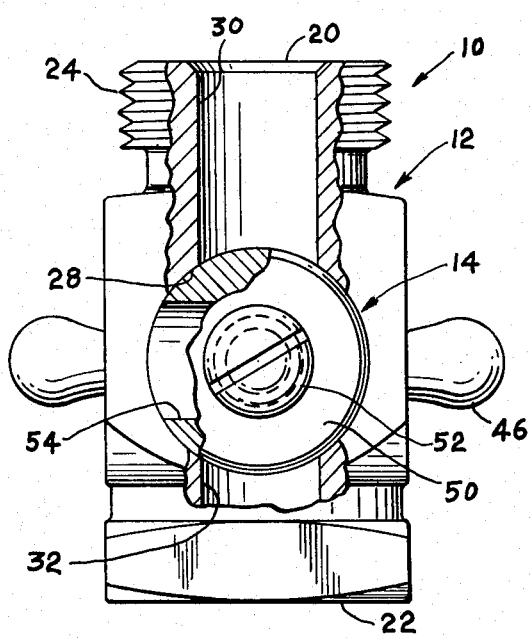
FIG. 4 is a rear elevational view of the stopcock of FIG. 1, shown partially in section.
Figure 5:
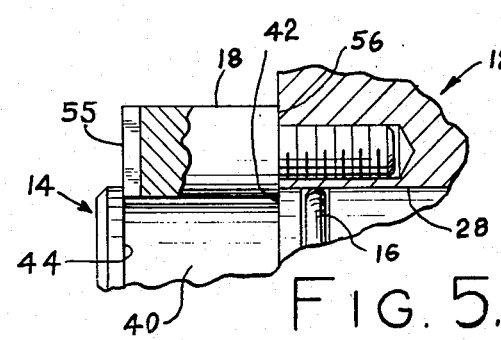
FIG. 5 is a fragmentary sectional view taken along the line 5—5 of FIG. 2.

The construction and mounting arrangement of the stud 18 and the manner in which it cooperates with the handle 56 limits angular movement of the handle to approximately 90°. Thus, the handle 56 is movable between a vertical position corresponding to a fully open position of the stopcock, as shown in FIGS. 1–3 and horizontal position shown in FIG. 4 and corresponding to a closed position of the stopcock 10. It will be evident that the handle 56 may be adjusted through a range of intermediate positions relative to the body 12 which correspond to various controlled conditions of flow through the stopcock.

Figure 6:
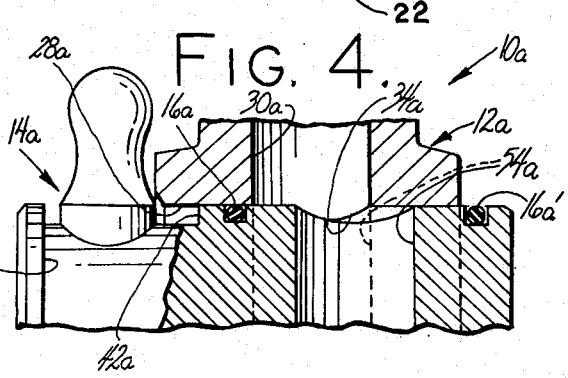
FIG. 6 is a fragmentary side elevational view similar to FIG. 3 but shows another stopcock embodying the invention.

Further, and in accordance with the invention, the risk of shearing or otherwise damaging the O-ring seal members during assembly may also be substantially eliminated by controlling the dimensions of the various parts which comprise the stopcock. Referring now to FIG. 6, another stopcock embodying the invention and indicated generally at 10a illustrates a stopcock wherein seal damage is avoided by controlled dimensioning. Parts of the stopcock 10a which correspond to parts previously described bear the same reference numerals as the previously described parts and a suffix letter *a* and will not be hereinafter further discussed.

The stopcock 10a includes a body 12a and a turn plug 14a which includes a cylindrical portion 48a. The stopcock 10a differs from the previously described stopcock 10 in that the cylindrical portion 48a wholly defines both of the annular grooves for receiving the seal members 16a and 16a' *and is dimensioned to cooperate with the body 12a* in a particular manner during assembly. More specifically as the turn plug 14a is assembled with the body 12a, it is inserted into and through the bore 28a and moved in an axial direction to an assembly position shown in full lines in FIG. 6. In the assembly position, the annular groove at the left end of the body which contains the seal member 16a is disposed between and axially spaced from the left end of the bore 28a and the openings through the bore wall defined by the upper sharp edge 34a and the corresponding lower sharp edge (not shown). When the turn plug 14a is in its assembly position, the annular groove at the right end of the turn plug, as it appears in FIG. 6, is exposed externally of the bore and axially spaced outwardly from the right end thereof to receive the other seal member or O-ring 16a' therein. After the seal member 16a' has been positioned in its associated groove, the turn plug 14a is moved axially of the body to another intermediate assembly position wherein both seal members are disposed within the bore but out of engagement with the sharp edges defined by the intersection of the inlet and outlet passageways and the bore wall. The relative dimensions of the bore 28a and the plug 14a are such that a stud similar to the stud 18, but not shown, may be positioned between abutments 42a and 44a on the turn plug and threaded into engagement with the body 12a to move the turn plug to and retain it in its assembled position in the body, generally as aforedescribed. In the assembled position, the inlet and outlet passageways through the body 12a are coaxially aligned with the passageway 54a when the turn plug is in its open position. Each seal member 16a and 16a' is disposed within the bore 28a between an associated end of the bore and the upper edge 34a and corresponding lower edge (not shown). Thus, by properly dimensioning the parts of the stopcock 10a, it may be assembled without either seal member passing over a shear edge within the bore to avoid risk of damage to the elastomeric seal members or O-rings 16a and 16a'.

The stopcock of the present invention may be employed in a wide variety of fluid systems and have proven particularly suitable for use in a liquid beverage dispensing system wherein sanitary conditions are of utmost importance. The particular construction and arrangement of the stopcocks facilitate disassembly for cleaning and to permit replacement of the O-ring seals, as necessary.

I claim:

1. A stopcock comprising means defining a body having a bore therethrough and including an inlet opening and an outlet opening, said body having an inlet passageway communicating with said inlet opening and opening through the wall of said bore and an outlet passageway communicating with said outlet opening and opening through the wall of said bore, a turn plug having a connecting passageway extending therethrough and supported in said bore for coaxial rotation therein between open and closed positions, said connecting passageway communicating with said inlet passageway and said outlet passageway when said turn plug is in its open position to define a path for fluid flow through said stopcock, said connecting passageway being out of communication with at least one of the other passageways in the body when said turn plug is in its closed position, said turn plug having a shank extending axially outwardly beyond said body and including an annular axially outwardly facing first bearing surface and an annular axially inwardly facing second bearing surface, a stud having a part thereof threaded into said body and another part projecting outwardly from said body, said other part having a first axially inwardly facing abutment surface engaging said first bearing surface and a second axially outwardly facing abutment surface engaging said second bearing surface, said stud retaining said turn plug in assembly with said body and restraining it against axial movement in either direction relative to said body, and means on said turn plug for engaging said stud to limit rotational movement of said turn plug between open and closed positions relative to said body.

2. A stopcock as set forth in claim 1 wherein said cylindrical portion has a pair of axially spaced apart annular grooves therein and said stopcock includes a pair of annular seal members, each of said seal members received in an associated one of said grooves and in sealing engagement with said wall.

3. A stopcock as set forth in claim 2 wherein said inlet and said outlet passageways open through said wall between said seal members.

4. A stopcock as set forth in claim 3 wherein said connecting passageway extends diametrically through said turn plug between said seal members.

5. A stopcock as set forth in claim 3 wherein said turn plug comprises a plurality of parts and one of said seal members is associated with one of said parts and the other of said seal members is associated with another of said parts.

6. A stopcock as set forth in claim 5 wherein one of said annular grooves is at least partially defined by the other of said parts.

7. A stopcock as set forth in claim 6 wherein said other part defines one end of said turn plug and said stopcock includes a fastener securing said other part to said one part.

8. A stopcock as set forth in claim 3 wherein said turn plug is slidably received in said bore and movable axially thereof during assembly with said body to an assembly position wherein one of said annular grooves with one of said seal members therein is disposed in said bore between and axially spaced from one end of said bore and the openings through said wall thereof defined by said first and second passageways and the other of said annular groves is disposed outside of said bore and axially spaced outwardly of the other end of said bore and said openings through said wall thereof and said other groove with said other seal member therein is disposed in said bore between and axially spaced from said other end of said bore and said openings through said wall.

9. A stopcock as set forth in claim 1 wherein said stud projects outwardly from said stopcock body in generally axially parallel relation to said turn plug.

10. A stopcock as set forth in claim 1 wherein said means on said turn plug comprises a handle which has opposite end portions projecting generally diametrically outwardly from said shank portion, one of said end portions being engageable with said stud to limit angular movement of said turn plug in one direction to an open position, the other of said end portions being engageable with said stud to limit angular movement of said turn plug in an opposite direction to a closed position.

11. A stopcock comprising a body including a cylindrical bore therethrough and an inlet opening and an outlet opening therein, said body having an inlet passageway communicating with said inlet opening and opening through the wall of said bore and an outlet passageway communicating with said outlet opening and opening through the wall of said bore, a turn plug supported in said bore for angular movement relative to said body between open and closed positions and including a cylindrical portion received in said bore and having a diameter substantially equal to the diameter of said bore, said cylindrical portion having a connecting passageway extending therethrough, said turn plug including a shank portion extending coaxially outwardly from said cylindrical portion and beyond said body, said turn plug having a radially disposed axially outwardly facing annular first bearing surface on said cylindrical portion and a radially disposed axially inwardly facing annular second bearing surface on the outer end part of said shank, said connecting passageway communicating with said inlet passageway and said outlet passageway when said turn plug is in its open position to define a path for fluid flow through said stopcock, said connecting passageway being out of communication with at least one of the other passageways in the body when said turn plug is in its closed position, and a single stud having a part thereof threaded into said body and another part projecting outwardly therefrom in generally parallel relation to said shank portion, said other part having an axially inwardly facing annular abutment surface at its inner end engaging said first bearing surface and an axially outwardly facing abutment surface at its outer end engaging said second bearing surface, said stud retaining said turn plug in assembly with said body, restraining said turn plug against axial movement in either direction relative to said body and limiting angular movement of said turn plug between its open and closed positions relative to said body.

* * * * *